(12) United States Patent
Bihannic

(10) Patent No.: US 9,010,134 B2
(45) Date of Patent: Apr. 21, 2015

(54) OPTRONIC INFRARED SYSTEM WITH PREDICTIVE MAINTENANCE FOLLOWING A SUDDEN DRIFT

(75) Inventor: Didier Bihannic, Egly (FR)

(73) Assignee: Thales, Neuilly-sur-Seine (FR)

( * ) Notice: Subject to any disclaimer, the term of this patent is extended or adjusted under 35 U.S.C. 154(b) by 1107 days.

(21) Appl. No.: 12/989,397

(22) PCT Filed: Apr. 14, 2009

(86) PCT No.: PCT/EP2009/054373
§ 371 (c)(1),
(2), (4) Date: Oct. 22, 2010

(87) PCT Pub. No.: WO2009/130137
PCT Pub. Date: Oct. 29, 2009

(65) Prior Publication Data
US 2011/0043638 A1 Feb. 24, 2011

(30) Foreign Application Priority Data

Apr. 25, 2008 (FR) ...................... 08 02335

(51) Int. Cl.
| | |
|---|---|
| *F25B 49/00* | (2006.01) |
| *G01K 13/00* | (2006.01) |
| *F25B 19/00* | (2006.01) |
| *F25D 29/00* | (2006.01) |
| *G01J 5/06* | (2006.01) |

(52) U.S. Cl.
CPC ............ *F25B 49/005* (2013.01); *F25D 29/005* (2013.01); *F25D 29/006* (2013.01); *F25D 29/008* (2013.01); *F25D 29/00* (2013.01); *F25D 2700/12* (2013.01); *G01J 5/061* (2013.01)

(58) Field of Classification Search
CPC ..... F25B 49/004; F25D 29/00; F25D 29/005; F25D 29/006; F25D 29/008; F25D 2700/12; F25D 2700/121

USPC .................. 62/51.1, 125, 127, 129, 157, 159; 340/540, 584, 585, 587; 700/176, 178, 700/182–187, 306

See application file for complete search history.

(56) References Cited

U.S. PATENT DOCUMENTS

| | | | | |
|---|---|---|---|---|
| 4,574,871 | A | * | 3/1986 | Parkinson et al. ............ 165/11.1 |
| 4,936,105 | A | * | 6/1990 | Takechi et al. ................. 62/129 |

(Continued)

FOREIGN PATENT DOCUMENTS

| | | |
|---|---|---|
| EP | 0 747 644 A2 | 12/1996 |
| JP | 62-30924 A | 2/1987 |
| WO | 2007/017866 A1 | 2/2007 |

*Primary Examiner* — Frantz Jules
*Assistant Examiner* — Keith Raymond
(74) *Attorney, Agent, or Firm* — Baker & Hostetler LLP

(57) ABSTRACT

The invention relates to an optronics system equipped with: a detector cooler having a cooling machine, a cryostat, an IR detector placed in the cryostat, and a sensor for measuring the temperature $T_D$ of the detector; and a processing card which includes means for servocontrolling the cooling machine according to the temperature $T_D$. The system includes a sensor for sensing the system's internal temperature $T_S$, and the processing card includes means for calculating: the refrigerating time (TMF) based on the temperatures $T_D$ and $T_S$, on each "on-off" cycle of the detector cooler, the trend of the drift in the refrigerating time TMF, as a function of the number of "on-off" cycles of the detector cooler, a sudden drift as a function of said trend of the drift of the TMF, and means for storing data used in said calculations; these data are aggregated data and not the measurements of temperatures $T_D$ and $T_S$, nor said TMFs, in order to limit the size of the storage means.

9 Claims, 3 Drawing Sheets

(56) References Cited

U.S. PATENT DOCUMENTS

| | | | |
|---|---|---|---|
| 5,729,474 A * | 3/1998 | Hildebrand et al. | 700/276 |
| 5,734,593 A * | 3/1998 | Madni et al. | 700/300 |
| 6,553,774 B1 * | 4/2003 | Ishio et al. | 62/126 |
| 6,614,353 B2 * | 9/2003 | Ozawa | 340/585 |
| 6,955,302 B2 * | 10/2005 | Erdman, Jr. | 236/51 |
| 7,752,853 B2 * | 7/2010 | Singh et al. | 62/129 |
| 2006/0144057 A1 * | 7/2006 | You et al. | 62/126 |
| 2010/0293968 A1 * | 11/2010 | Garaway et al. | 62/51.2 |

\* cited by examiner

OPTRONIC INFRARED SYSTEM WITH PREDICTIVE MAINTENANCE FOLLOWING A SUDDEN DRIFT

CROSS-REFERENCE TO RELATED APPLICATIONS

This application is a National Stage of International patent application PCT/EP2009/054373, filed on Apr. 14, 2009, which claims priority to foreign French patent application No. FR 08 02335, filed on Apr. 25, 2008, the disclosures of which are incorporated by reference in their entirety.

FIELD OF THE INVENTION

The field of the invention is that of optronics systems such as thermal cameras, equipped with cooled infrared (IR) detectors, also designated detector coolers.

BACKGROUND

FIG. 1 shows a conventional detector cooler design comprising:
- an IR detector 1 placed in a vacuum chamber (cryostat 2) which maintains the temperature of this chamber at an operating temperature of the detector, or approximately −200° C.,
- a cooling machine 3 which uses, for example, helium and supplies the cryostat with the refrigeration needed to bring its temperature (usually lower its temperature) from an ambient temperature to the operating temperature. The time needed to reach the operating temperature is designated "refrigerating time" (TMF). The overall performance is measured over a meaningful temperature range: from −173° C. to −190° C. The TMF to change from −173° C. to −190° C. is typically a few tens of seconds,
- a device 4 for servocontrolling this cooling machine according to the temperature of the detector $T_D$ supplied by a sensor 8.

The detector coolers that are used at present are fragile, heterogeneous in that no two identical detector coolers behave in the same way, and costly. The actual maintenance is limited to confirming the breakdown when it occurs, that is to say, by detecting a departure from the refrigerating time specification. The breakdown leads to unavailabilities and dissatisfaction among the users. Furthermore, the maintenance costs are high.

Consequently, there is currently a need for a system that makes it possible to overcome the abovementioned drawbacks without in any way increasing its bulk.

SUMMARY OF THE INVENTION

The underlying principle of the invention consists in anticipating malfunctions, that is to say, performing predictive maintenance in order to limit the breakdowns. This predictive maintenance is based on monitoring the state of health of the cooler-detector. More specifically, it is performed on the basis of the measurement of the drift in the refrigerating time. In practice, this drift in the TMF may betray:
- a helium leak from the cooling machine,
- pollution of the helium,
- a degradation of the cryostat vacuum,
- resulting in wear of the cooling machine in the form of:
  degradation of the mechanical elements of the cooling machine,
  degradation of the thermal insulation,
  variation of the optronics system's internal temperature when starting refrigeration,
  variation of the initial temperature of the detector when starting refrigeration.

The refrigerating time increases when the cooling machine wears out. Each time the cooling machine is started up, this TMF is measured. The invention is based on a statistical processing of these data. This makes it possible to detect a significant change in this TMF in order to thus estimate the life potential of the detector cooler.

One of the drawbacks in this statistical processing lies in the storage of the data, because the optronics systems have little memory available for maintenance. The use of the Koenig-Huyghens statistical model does away with the storage problems. The algorithm enables each detector cooler to construct, on its own, its own behavior model. The system is "self-adaptive".

More specifically, the subject of the invention is an optronics system equipped:
a. with a detector cooler which comprises:
  i. a cooling machine,
  ii. a cryostat,
  iii. an IR detector placed in the cryostat,
  iv. a sensor for measuring the temperature $T_D$ of the detector,
b. with a processing card which includes means for servocontrolling the cooling machine according to the temperature $T_D$.

It is mainly characterized in that the system comprises a sensor for sensing the system's internal temperature $T_S$, and in that the processing card comprises means for calculating:
  the refrigerating time based on the temperatures $T_D$ and $T_S$, on each "on-off" cycle of the detector cooler,
  the trend of the drift in the refrigerating time TMF, as a function of the number of "on-off" cycles of the detector cooler,
  a sudden drift as a function of said trend of the drift in the TMF, and means for storing data used in said calculations and in that these data are aggregated data and not the measurements of temperatures $T_D$ and $T_S$, nor said TMFs, in order to limit the size of the storage means.

This solution therefore makes it possible, with a minimum of memory space, to determine any sudden drift in its behavior. The result of this is notably a saving in the memory space needed for the other applications of the optronics system, better control of the detector cooler by the user, enhanced operational performance, an increase in autonomy by a reduction in the energy consumed by the detector cooler.

This then gives the opportunity to:
trigger a preventive maintenance operation because the faults detected are reversible,
give the user the choice to start out with a detector cooler that is in good condition rather than with excessively shortened potential.

It advantageously comprises a predictive maintenance indicator linked to the calculation means.

According to one feature of the invention, the sudden drift is defined as a function of an average TMF.

According to another feature of the invention, the calculation is carried out based on a TMF sum, an aggregated number of refrigerations, and an aggregate of the squares of the TMFs.

Preferably, the calculation is carried out for different classes of temperature $T_D$ of the detector.

The TMF sum, the aggregate number of refrigerations, and the aggregate of the squares of the TMFs are typically calculated for a temperature class.

Each temperature class is advantageously the subject of independent calculations.

This system is, for example, a thermal camera.

BRIEF DESCRIPTION OF THE DRAWINGS

Other features and advantages of the invention will become apparent from reading the following detailed description, given as a nonlimiting example, and with reference to the appended drawings in which.

From one figure to another, the same elements are identified by the same references.

DETAILED DESCRIPTION

Figure 1:
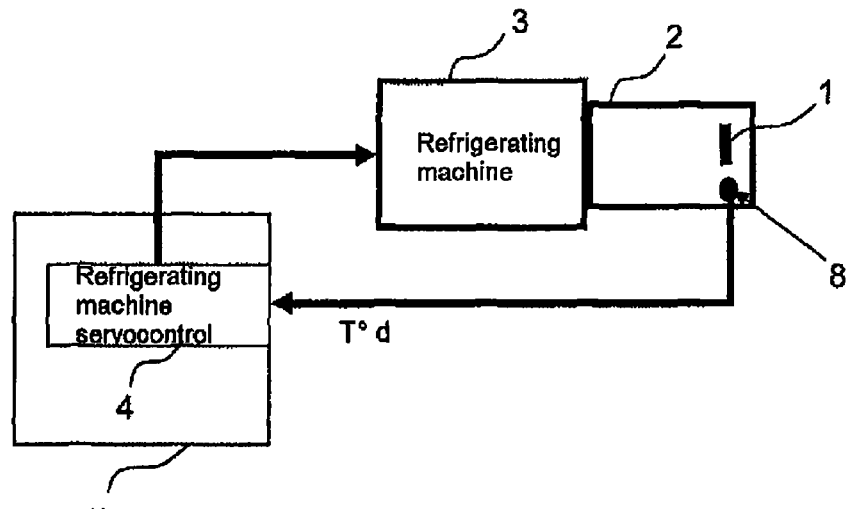
FIG. 1, already described, diagrammatically represents an optronics system according to the state of the art, FIG. 2 diagrammatically represents an optronics system according to the invention.
Figure 2:
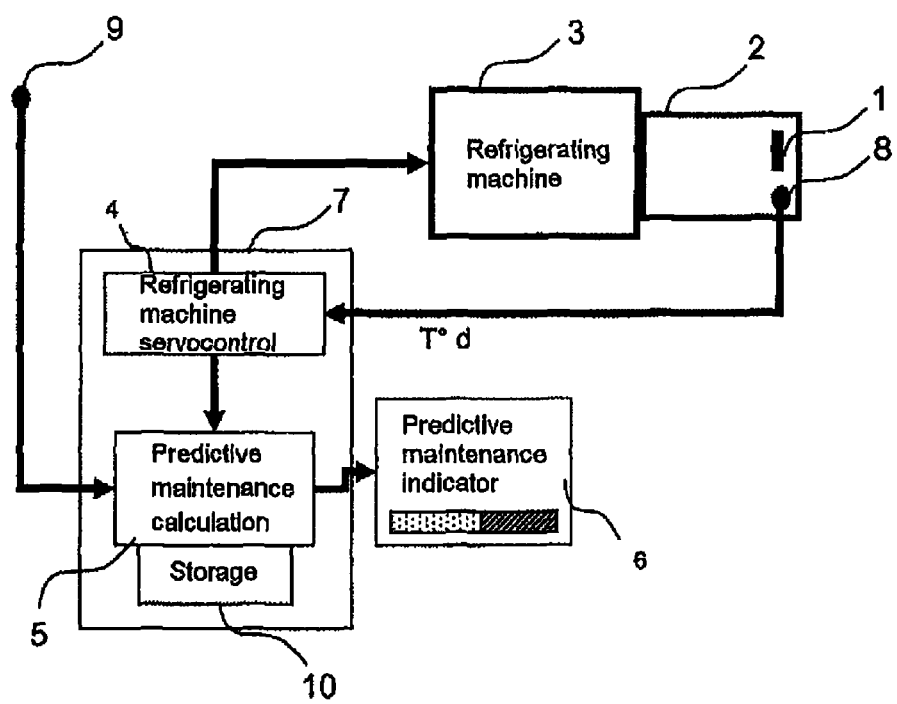

The system according to the invention represented in FIG. 2 comprises, in addition to the system of the state of the art, a sensor 9 for measuring the system's internal temperature $T_S$ and calculation 5 and data storage 10 means, as well as a predictive maintenance indicator 6.

The invention is based on a statistical processing of the TMF measurements on each startup of the cooling machine 3. This makes it possible to detect a significant change in this TMF, that is to say, check that this TMF does not drift unacceptably. This is tantamount to detecting a sudden and abrupt drift in the TMF.

Figure 3:
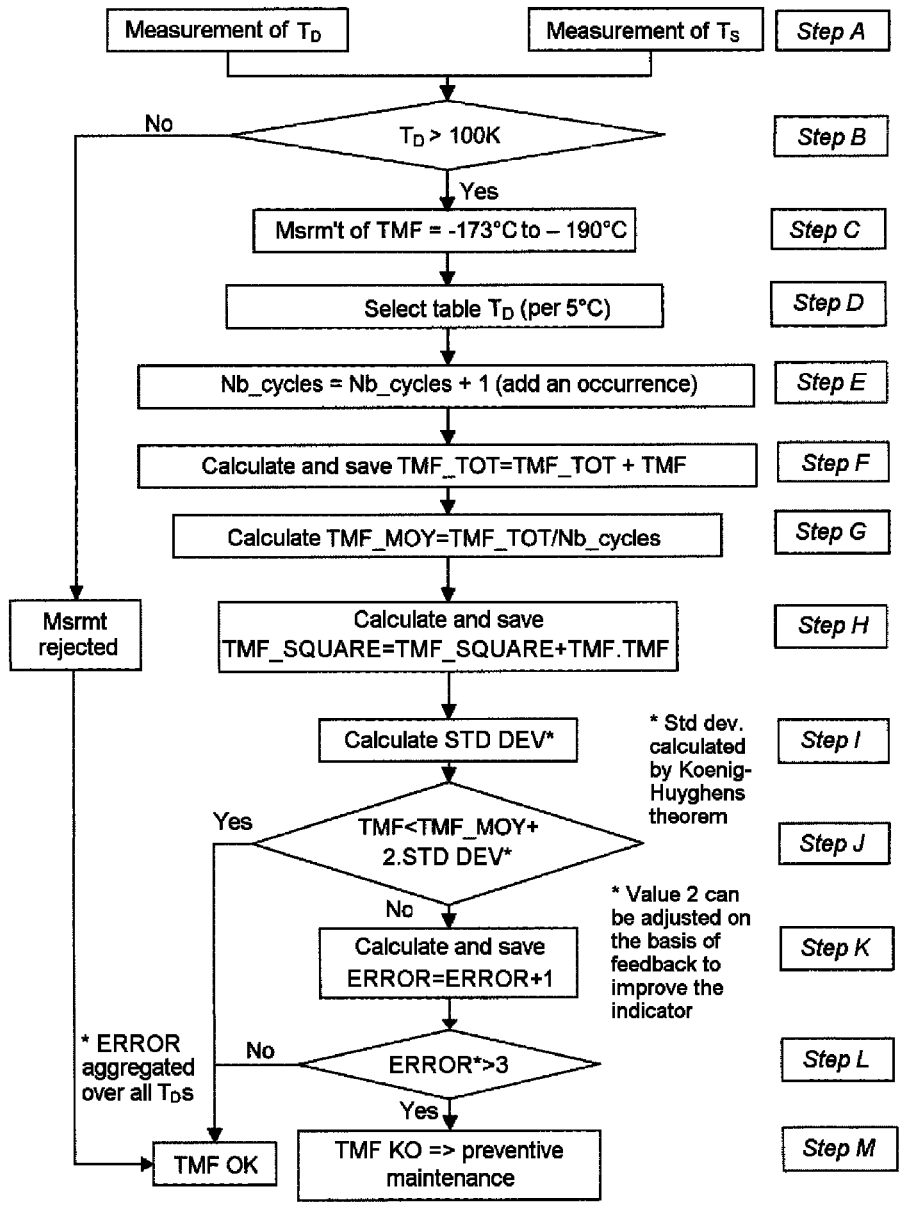
FIG. 3 is a flow diagram showing the method of detecting a sudden and abrupt drift, FIG. 4 diagrammatically represents a curve of the temperature of the detector as a function of time.

This calculation is described in relation to the flow diagram of FIG. 3.

This calculation is based on the measurement of the temperature $T_D$ of the detector and of the optronics system's internal temperature $T_S$ (step A). These measurements are then validated (step B), that is to say, they are taken into account only subject to certain conditions. In practice, the following factors disturb the measurement of the TMF; it is therefore essential to overcome these disturbances.

a. A variation in the camera's internal temperature when starting refrigeration.

The calculation is carried out for different classes of temperature $T_D$ or $T_S$, for example in steps of 5° C. Each temperature class is the subject of an independent average/standard deviation calculation. It is therefore pointless to relate the measurements to a reference temperature. Furthermore, it is assumed that, for a given optronics system, the conditions of use are fairly reproducible and therefore centered on two or three temperature classes.

b. A variation in the initial temperature of the detector when starting refrigeration.

If the refrigeration is done a little after a shutdown, the TMF may be very short (the cryostat remains cold for a few hours after stopping the MAF). This TMF is then not representative because the refrigeration does not perform a complete refrigeration cycle. These cases are eliminated by comparison of the initial temperature $T_D$ with the system's internal temperature $T_S$. If $T_D$ deviates too far from $T_S$, the measurement is not taken into account.

Once the measurements have been validated, a calculation for each temperature class, of the standard deviation and of the average of the measured TMFs makes it possible to check that the current TMF measurement remains acceptable. Each temperature class is the subject of independent calculations. It is therefore pointless to relate the measurements to a reference temperature.

The standard deviation is preferably calculated according to the Koenig-Huyghens theorem. This theorem is used to calculate the standard deviation of a data sample without saving all the measurements. On each measurement, the data are reassessed then saved. The measurement of the TMFs, $T_D$ and $T_S$ is lost.

For each temperature class, the following data are used:

TMF_TOT which is the sum of all the TMFs in the temperature class concerned,

Nb-cycles which is the aggregated number of refrigerations in the temperature class concerned, TMF_SQUARE which is the aggregate of the squares of the TMFs in the temperature class concerned; this TMF_SQUARE is used to calculate the standard deviation, ERROR which is the counter of the measurements that exceed the average TMF of k standard deviations. The quantity k of standard deviations remains a parameter that can be adjusted according to feedback in order to improve the relevance of this counter.

These data are aggregate data whose value evolves as a function of the current measurement. Each measurement is not saved. This makes it possible to limit the memory space dedicated to this test of sudden drift of the TMF.

The first 3 items of data are saved in a table of K columns, K being the number of different temperature classes, the lines of the table corresponding to these data. The number K is, for example, determined by the number of 5° C. blocks. The ERROR counter is incremented regardless of the temperature at which the ERROR occurs. There is therefore only one ERROR variable.

Figure 4:
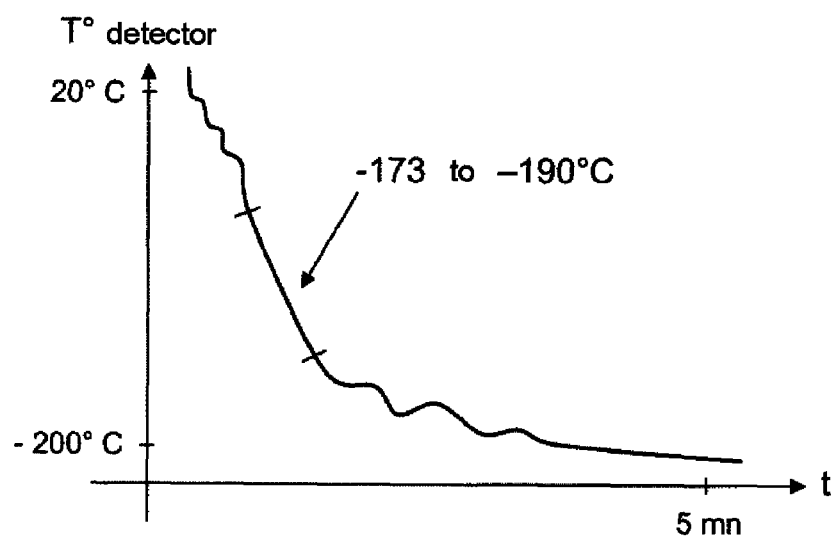

Reference should be made to the flow diagram of FIG. 3. The TMF is measured within a predefined temperature range (step C). This range is defined on the basis of the curve of the temperature of the detector as a function of time, diagrammatically represented in FIG. 4: this range corresponds to the quasi-linear portion of the curve typically lying between −173 and −190° C.

The column of the table in which the data is saved is selected according to the temperature $T_D$ of the detector (step D).

Various data are then calculated and saved in said column of the table in order for the trend of the refrigerating time to be calculated: Nb-cycles (step E), TMF_TOT (step F), and TMF_SQUARE (step H). The average TMF, TMF_MOY, is also calculated, which is equal to TMF_TOT/Nb_cycles (step G); this data is not saved in the table.

The standard deviation is then calculated (step I), preferably by the Koenig-Huyghens theorem because it makes it possible to calculate the standard deviation of a data sample without saving all the TMF, $T_D$ and $T_S$ measurements. It is calculated according to the following formula:

STANDARD DEVIATION =

$$\sqrt{\frac{TMF\_SQUARE}{Nb} - TMF\_MOY^2} \text{ (Koenig-Huygens formula)}$$

The measured TMF is then compared to a threshold value (step J) representative of an imminent breakdown; this value is equal to TMF_MOY+k. standard deviation.

The number k of standard deviations is configurable. k=2 for example.

If TMF<TMF-MOY+k. standard deviation, then this TMF is correct, otherwise there is a fault and the ERROR counter is incremented (step K) and compared to a predetermined number P (step L). It is incremented regardless of the temperature $T_D$ at which this TMF occurs: it is thus aggregated over all the temperatures of the detector. There is therefore only one ERROR counter for all the temperature classes. The number P is configurable. P=3 for example.

If the ERROR counter does not exceed this number P, then, although an anomaly is a priori detected according to the step K, it is not considered to signify a drift to be taken into account. If the counter exceeds this number P, this means that a sudden and abrupt drift has occurred; a user interface of the optronics system then recommends a return for a preventive maintenance operation (step M). This user interface 6 may be an audible and/or visual interface.

The values k and P may be adjusted according to feedback in order to improve the relevance of the ERROR counter.

This method does away with the disparity problems associated with production. Each optronics system has an analysis specific to it. There is no generic model. In addition, the method is tolerant at the start of life then the standard deviation narrows. This allows the optronics system time to "construct" its model. The ERROR counter becomes of interest only after a certain number of startups. This number of startups is variable; it is, for example, around 30.

This solution therefore makes it possible, with a minimum of memory space, to determine any sudden drift in its behavior. The result of this is notably:

a saving in the memory space (the memory space needed is 2 KB) which is thus available for other applications of the optronics system, better control of the detector cooler by the user, enhanced operational performance, an increase in autonomy through a reduction in the energy consumed by the detector cooler.

The invention claimed is:

1. A maintenance method for an optronics system equipped:
   with a detector-cooler which comprises:
      a cooling machine,
      a cryostat,
      an IR detector placed in the cryostat,
      a first sensor for measuring the temperature $T_D$ of the IR detector,
   with a processing card which includes means for servocontrolling the cooling machine according to the temperature $T_D$,
   the method comprising:
      for each cycle of a number "nb-cycles" of refrigerating cycles of the cooling machine designated "on-off" cycles,
         calculating a system's internal temperature $T_S$ by means of a second sensor measuring the system's internal temperature $T_S$; and
         calculating by the processing card of an refrigerating time (TMF) based on the temperatures $T_D$ and $T_S$;
      on completion of the "nb-cycles" "on-off" cycles, calculating, by the processing card:
         an average TMF over the number of "nb-cycles";
         a standard deviation by comparing the TMF for each of "nb-cycles" with the average TMF;
         a trend of a drift of the TMF based on the average TMF and the standard deviation; and
         a sudden drift based on a measured TMF and the trend of the drift; and
      storing data used in said calculations, the data being aggregated data and not the measured temperatures $T_D$ and $T_S$ nor said TMF.

2. The maintenance method according to claim 1, wherein, on each "on-off" cycle of the detector-cooler, the method further comprises a step for calculating the product of the TMF by the cycle number, and, on completion of the "nb-cycles" cycles, a step for storing the following aggregated data:
   "nb-cycles",
   the sum of the TMFs over the number "nb-cycles" of cycles concerned,
   the sum of the squares of the TMFs over the number of "nb-cycles" of cycles concerned.

3. The maintenance method according to claim 1, wherein the steps are reiterated for different classes of temperature $T_D$ of the detector or $T_S$ of the system.

4. The maintenance method according to claim 1, wherein each of different classes of the temperature $T_D$ is the subject of independent calculations.

5. A thermal camera equipped:
   with a detector-cooler which comprises:
      a cooling machine,
      a cryostat,
      an IR detector placed in the cryostat,
      a first sensor for measuring the temperature $T_D$ of the IR detector,
   with a second sensor for measuring the camera's internal temperature $T_S$,
   with a processing card which includes means for servocontrolling the cooling machine according to the temperature $T_D$ and means for implementing the maintenance method for said camera as claimed in claim 1.

6. The thermal camera of claim 5, wherein the sudden drift is defined as a function of an average TMF.

7. The thermal camera of claim 5, wherein, on each "on-off" cycle of the detector-cooler, the method further comprises a step for calculating the product of the TMF by the cycle number, and, on completion of the "nb-cycles" cycles, a step for storing the following aggregated data:
   "nb-cycles",
   the sum of the TMFs over the number "nb-cycles" of cycles concerned,
   the sum of the squares of the TMFs over the number of "nb-cycles" of cycles concerned.

8. The thermal camera of claim 5, wherein the steps are reiterated for different classes of temperature $T_D$ of the detector or $T_S$ of the system.

9. The thermal camera of claim 5, wherein each of different classes of the temperature $T_D$ is the subject of independent calculations.

* * * * *